US008021039B2

(12) United States Patent
Amato (10) Patent No.: US 8,021,039 B2
(45) Date of Patent: Sep. 20, 2011

(54) QUALITY CONTROL MATERIAL MONITOR

(76) Inventor: Frank Amato, Winter Springs, FL (US)

( * ) Notice: Subject to any disclaimer, the term of this patent is extended or adjusted under 35 U.S.C. 154(b) by 623 days.

(21) Appl. No.: 11/936,171

(22) Filed: Nov. 7, 2007

(65) Prior Publication Data

US 2009/0116536 A1   May 7, 2009

(51) Int. Cl.
*G01N 25/00* (2006.01)
*G01K 3/00* (2006.01)
*G01K 7/00* (2006.01)
*G01K 1/00* (2006.01)

(52) U.S. Cl. .......... 374/141; 374/45; 374/163; 374/208; 374/112; 374/10; 702/130; 422/82.12

(58) Field of Classification Search ............. 374/10, 374/112, 163, 141, 208, 45; 702/130; 422/82.12
See application file for complete search history.

(56) References Cited

U.S. PATENT DOCUMENTS

| | | | | |
|---|---|---|---|---|
| 5,374,398 A * | 12/1994 | Isami et al. | ................. | 422/81 |
| 5,665,314 A * | 9/1997 | Berger et al. | ................. | 422/89 |
| 6,148,666 A * | 11/2000 | Roesicke | ................. | 73/290 R |
| 6,406,918 B1 * | 6/2002 | Bannister et al. | ............. | 436/155 |
| 7,018,093 B2 * | 3/2006 | Park et al. | ................. | 374/1 |
| 7,100,428 B1 * | 9/2006 | Dziki | ................. | 73/73 |
| 7,674,616 B2 * | 3/2010 | Farnam et al. | ............. | 435/287.1 |
| 2002/0146836 A1 * | 10/2002 | Neilson et al. | ............. | 436/147 |
| 2004/0014233 A1 * | 1/2004 | Bannister et al. | ............. | 436/155 |
| 2004/0023404 A1 * | 2/2004 | Shibata | ................. | 436/155 |
| 2004/0173142 A1 * | 9/2004 | Willis | ................. | 117/200 |
| 2004/0197927 A1 * | 10/2004 | Jeng et al. | ................. | 436/171 |
| 2004/0265892 A1 * | 12/2004 | Wittwer et al. | ............. | 435/6 |
| 2005/0084424 A1 * | 4/2005 | Ganesan et al. | ............. | 422/100 |
| 2005/0147533 A1 * | 7/2005 | Cole et al. | ................. | 422/73 |
| 2005/0190813 A1 * | 9/2005 | Schick | ................. | 374/10 |
| 2007/0054404 A1 * | 3/2007 | Huo et al. | ................. | 436/66 |
| 2007/0292941 A1 * | 12/2007 | Handique et al. | ............. | 435/288.7 |
| 2008/0044311 A1 * | 2/2008 | Iguchi et al. | ................. | 422/63 |
| 2008/0219894 A1 * | 9/2008 | Ganesan et al. | ............. | 422/82.12 |
| 2009/0285257 A1 * | 11/2009 | Revesz et al. | ............. | 374/14 |
| 2011/0070587 A1 * | 3/2011 | Fuernkranz et al. | ............. | 435/6 |

* cited by examiner

*Primary Examiner* — Lisa Caputo
*Assistant Examiner* — Mirellys Jagan
(74) *Attorney, Agent, or Firm* — Beusse, Wolter, Sanks, Mora & Maire, P.A.

(57) ABSTRACT

An apparatus is disclosed designed to monitor the thermal status of a quality control material. The apparatus has the ability, with visual and/or audible means, to alert the user when the quality control material has become thermally equal to the local, ambient environment by way of natural thermal entropy. The apparatus alerts the user by visual and/or audible indicators when the quality control material, after removal from the monitor, should be returned to cool storage after a pre-determined period to maintain its designed criteria, integrity and/or purpose.

11 Claims, 12 Drawing Sheets

QUALITY CONTROL MATERIAL MONITOR

BACKGROUND

Quality control material monitors would be very valuable in many industries, including research and medical fields. Quality control materials may have the form of solids, gases, or liquids and can have pre-determined and established characteristics of stability, linearity and reproducibility of results. These materials must be fabricated, shipped, stored, handled and used within certain guidelines and limits to maintain their designed integrity. Environmental exposures and durations regarding time, temperature, light, stress, vibrations and any other physical processes may affect the integrity of the quality control materials.

As a specific example, in the medical field, Hematology Analyzers, which are particle counters, are used in clinical laboratories, emergency rooms and research clinics to measure blood cell types, morphology (stage of cell development) and quantity within a specific liquid blood sample volume. These blood samples can contain a broad range of cell types and quantity differing from patient to patient. The measured results derived from these analyzers of the blood sample must correlate accurately, within limits, from one hematology analyzer to another. A hematology quality control material product is made from blood components, blood plasma, organic materials, synthetic materials and stabilizer materials. These materials are mixed together and carefully processed in a special container and are designated as a quality control product lot (batch). A test sample from the lot is then tested and measured by trained technologists using visual microscopic and other closely controlled manual means. This same test lot sample is also run on carefully maintained reference hematology analyzers in order to compare their results against the manually derived results. These results create the required standardized values and limits all other hematology analyzers may use to correlate with each other. Once these measured lot values are established for what will become a quality control material product, the product lot will be assigned a lot designation number, expiration date and an assay document composed as a table of values for each blood component parameter in the quality control product and matched to a specific hematology analyzer model for use. The finished quality control material product is then dispensed and sealed into pre-labeled vials and sent with the matching assay document to customers. This product will be used for calibration verification purposes in verifying operational accuracy, linearity and reproducibility of the customer's hematology analyzers.

The Quality Control Material Monitor will provide for the user a safeguard to maintain the integrity of the quality control material for its purpose and use.

Intrinsic properties of a quality control material product can be fragile and susceptible to any subtle environmental exposures outside the boundaries of their design. With hematology quality control material products, differences with use preparation and post-use techniques by numerous users from different work shifts in a busy laboratory environment can affect the product's designed integrity before its expiration period has been reached. Currently, such products contained in plastic or glass vials, are simply removed from cool storage and arbitrarily placed onto any unspecified surface in either a horizontal or vertical position until they warm up to, what is assumed to be by the user, the ambient room temperature which is required for calibration verification of the hematology analyzer.

One user, for instance, may use a temperature-dependant method to prepare the material for use. By his or her discretion, the user would decide when the quality control material vial would be ready, subjectively, with the repeated manual handling of the vial through a tactual sensing of the vial's temperature. Such a method would be done with, or without, the wearing of protective gloves, of which could also skew the sensory decision of the user. This manual handling can elevate the vial's temperature via body heat from the hands beyond the ambient room temperature. The repeated lifting and setting down of the quality control material may also cause unintended mixing beyond the product's designed specifications. Dynamic changes within the ambient room environment can also be a factor. Time of day, when the vial may be heated from being directly exposed to sunlight, air conditioning convection across the vial, causing it to be cooler than expected and, the random surface placement where the vial is placed vertically by one user on one shift then, horizontally by another user on a different shift. Even random placement directly on surfaces that may not be equal to ambient room temperature can eventually affect the quality control material.

Another method is time-dependant. The user monitors the elapsed time on a clock or, the user may use a timer that is preset to a specific period of time to alarm when the quality control material should be ready for use. This time-dependant method does not take into account of the fact that the natural thermal entropy period (unassisted movement towards an equal state of the local ambient environment) for the vial to reach ambient room temperature will decrease as there becomes less and less material in the vial from usage. This method causes the quality control material to then be exposed to ambient room temperature for unnecessary periods of time.

While performing multiple lab duties, the user may hasten to use the quality control material before it reaches ambient room temperature. The user may become distracted with lab duties and not take notice to return the quality control material back into cool storage in a timely manner or with any regularity. If the quality control material is used too early after removal from cool storage and is still below the ambient room temperature, the components in the mixture may still be clumped and in a jelled state. If left out too long, the components in the mixture may begin to swell larger than intended and the mixture may begin to break down and fragment.

SUMMARY

According to one embodiment, the invention pertains to an apparatus configured to monitor the thermal status of a quality control material. The apparatus has the ability, with visual and/or audible means, to alert the user when the quality control material has become thermally equal to the local, ambient environment by way of natural thermal entropy. The apparatus alerts the user by visual and/or audible indicators when the quality control material, after removal from the monitor, should be returned to cool storage after a pre-determined period to maintain its designed criteria, integrity and/or purpose.

Another aspect of this invention relates to monitoring the temperature of a sample of material and providing the user with an indication that the material is ready for use. Another aspect of the invention relates to monitoring and determining the amount of time the material has been removed from the monitor for use, and providing the user with an indication that the material should be returned to storage to maintain its integrity. One particularly advantageous feature of this invention is the combination temperature and time dependent monitoring of a material which is unavailable in the market place.

In one embodiment, the quality control material monitor comprises at least one receptacle or well to receive a material sample. The receptacle has at least one sensor to detect the presence of the material (for example fluid sample) that has been placed in the receptacle or well of the device. The presence may be detected by use of a contact or non-contact well sensors. When the material is placed in the receptacle, a material temperature sensor monitors the temperature reading of the material. A reference temperature sensor measures the ambient temperature and is used as a reference temperature to determine when the material has reached ambient use temperature and thus ready for use.

This process of detecting the presence, monitoring the sample temperature in reference to the ambient use temperature, and indicating to a user that the material is ready for use may be controlled by a micro controller. The micro controller is programmed to receive signals from the material sensor indicating a sample is in a well, the sample material temperature sensor, the reference temperature sensor, and an actuating component. When the micro controller receives the signals it compares the material temperature sensor signals with the reference temperature signal to determine that the material is ready for use. The micro controller is programmed to send out signals to indicate to a user that the sample is ready for use when in the well. The mode of indicating to a user may be but not limited to an illuminating device or a sound emanating device or may be both.

According to one embodiment, the sample is removed from the device and a signal is sent to the micro controller to begin the count of the amount of time the material has been removed from the device well. An alternative embodiment implements the actuation of a button to cause a signal to be sent to the micro controller to begin the count. After a predetermined time, the micro controller will send a signal to the user but is not limited to emanation of a sound or by illumination or both to inform the user that it is time to return to storage the material.

According to another embodiment, the invention pertains to an apparatus to determine the thermal status of a material sample. The apparatus has a) at least one receptacle for receiving the material sample that is defined in the apparatus, b) at least one sample temperature sensor in communication with the receptacle so as to be sufficient to detect material sample temperature, c) at least one indicator, d) at least one reference temperature sensor to detect ambient temperature, e) a power supply to provide electrical power to operate the apparatus, and f) at least one micro controller comprising a first program code module for causing the microcontroller to obtain a sample temperature signal from said at least one temperature sensor and to compare the temperature signal with an ambient temperature signal from said at least one reference temperature sensor; and a second program code module for causing the at least one indicator to actuate upon the sample temperature signal equating, within a range of five percent, to the ambient temperature signal. According to a specific embodiment, indicator pertains to an illuminating device. The illuminating device may include, but is not limited to an LED light or incandescent light. The apparatus may also include an LCD or LED display screen, or analog display device (e.g. gauge, meter, etc.).

Other advantageous aspects and embodiments are described herein.

BRIEF DESCRIPTION OF DRAWINGS

FIG. 5a-FIG. 5g is a contiguous flowchart that denotes one embodiment of functional implementation.

DESCRIPTION OF ILLUSTRATIVE EMBODIMENTS

Reference Numerals

10.—Main Electronics Printed Circuit Board Including Related Components.
20.—Flexible Printed Circuit Board Including Related Components and Interconnect Ribbon Cable.
22.—Battery Holder Including Batteries.
24.—Sound Emitter.
26.—Reference Temperature Sensor.
28.—Well A Material Sensor.
30.—Well A Temperature Sensor.
32.—Well B Material Sensor.
34.—Well B Temperature Sensor.
36.—Well C Material Sensor.
38.—Well C Temperature Sensor.
40.—Main Electronics Printed Circuit Board Input-Output Connector Jack.
42.—Flexible Printed Circuit Board Interconnect Ribbon Cable Connector Plug.
44.—Flexible Printed Circuit Board Interconnect Ribbon Cable.
46.—Battery Holder Power Cable.
48.—Battery Holder Power Cable Connector Plug.
50.—Main Electronics Printed Circuit Board Connector Power Jack.
52.—Main Electronics Printed Circuit Board Electrical Interconnect Traces.
54.—Micro-Controller Integrated Circuit with Internal Voltage Comparator and Oscillator.
56.—Flexible Printed Circuit Board Electrical Interconnect Traces.
58.—Well C Bi-Color Indicator.
60.—Well B Bi-Color Indicator.
62.—Well A Bi-Color Indicator.
64.—Momentary Switch.
66.—Hole in Flexible Printed Circuit Board for Well A Bushing Insertion.
68.—Hole in Flexible Printed Circuit Board for Well B Bushing Insertion.
70.—Hole in Flexible Printed Circuit Board for Well C Bushing Insertion.
72.—Hole in Top Segment of Quality Control Material Monitor Enclosure for Well A Bushing Insertion.
74.—Hole in Top Segment of Quality Control Material Monitor Enclosure for Well B Bushing Insertion.
76.—Hole in Top Segment of Quality Control Material Monitor Enclosure for Well C Bushing Insertion.
78.—Hole in Top Segment of Quality Control Material Monitor Enclosure for Ribbon Cable and Plug.
80.—Well A Bushing.
82.—Well B Bushing.
84.—Well C Bushing.
85.—Top Segment of Quality Control Material Monitor Enclosure.

88.—Bottom Segment of Quality Control Material Monitor Enclosure.
90.—Battery Compartment Access Panel of Quality Control Material Monitor Enclosure.
92.—Battery Compartment of Quality Control Material Monitor Enclosure.
94.—Electronics Component Compartment of Quality Control Material Monitor Enclosure.
96.—Fastening Screw for Quality Control Material Monitor Enclosure.
98.—Quality Control Material Vial Inserted into Well A of Quality Control Material Monitor Enclosure.
100.—Illustration of Second Quality Control Material Vial Ready for Insertion into Well B.
102.—Illustration of Third Quality Control Material Vial Ready for Insertion into Well C.
104.—Assembled Quality Control Material Monitor.
106.—Adhesive Film Material Protective Strip.
108.—Adhesive Film Material.

Figure 1:
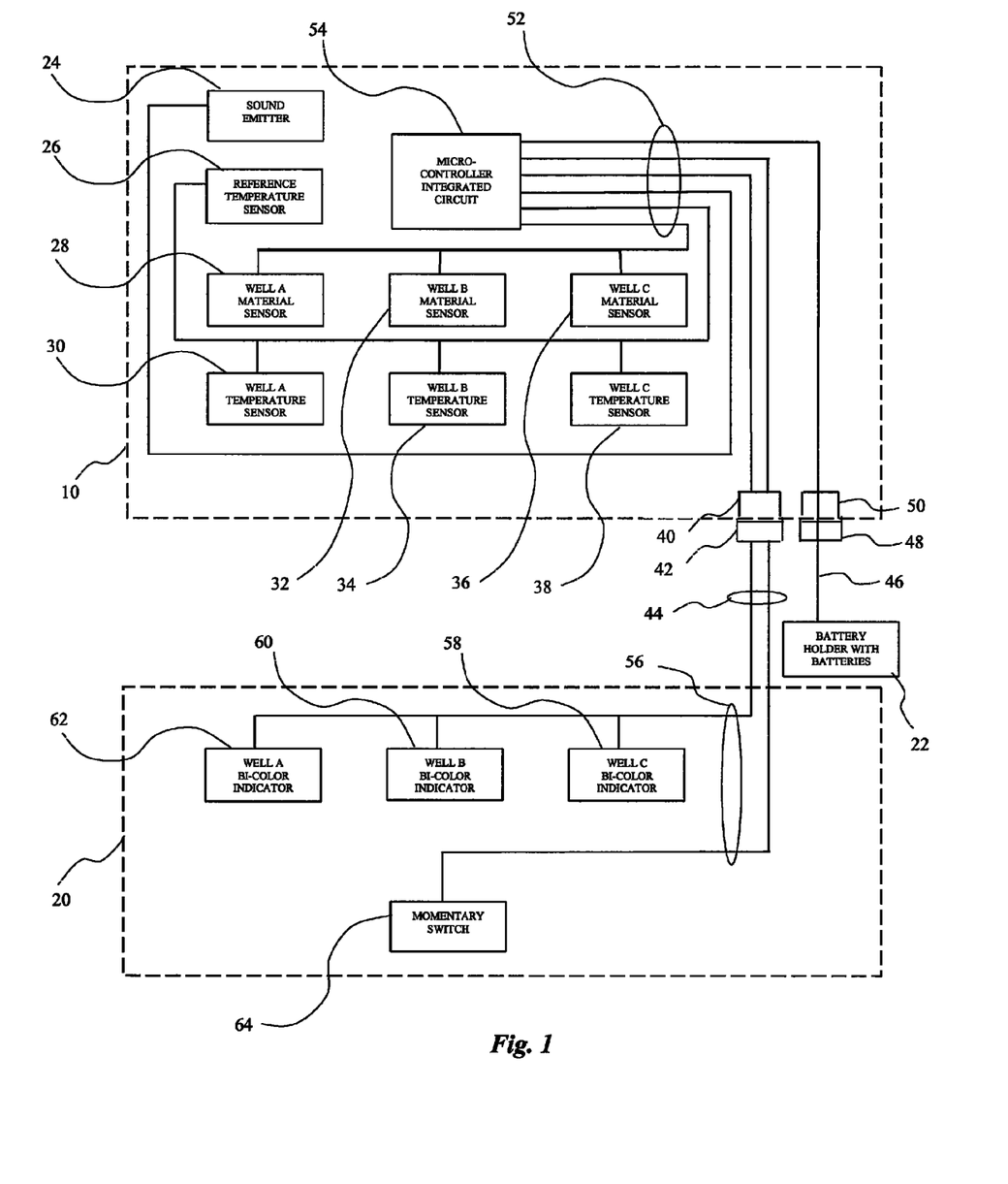
FIG. 1 is a block diagram configuration of electronic components of the invention.

FIG. 1 shows one preferred configuration of the major electronic components which perform the preferred functions of the invention. The Main Electronics Printed Circuit Board Including Related Components 10 contains one preferred configuration of those components that would be mounted within the embodiment of the invention. The Flexible Printed Circuit Board Including Related Components and Interconnect Ribbon Cable 20 contains one preferred configuration of those components that would be mounted onto the outside surface area of the invention.

A Battery Holder Including Batteries 22 is connected to Battery Holder Power Cable 46. Battery Holder Power Cable 46 is connected to Battery Holder Power Cable Connector Plug 48. Battery Holder Power Cable Connector Plug 48 connects to Main Electronics Printed Circuit Board Connector Jack 50.

Flexible Printed Circuit Board Including Related Components and Interconnect Ribbon Cable 20 is integrated with Flexible Printed Circuit Board Electrical Interconnect Traces 56. Flexible Printed Circuit Board Electrical Interconnect Traces 56 connects to Well A Bi-color Indicator 62. Flexible Printed Circuit Board Electrical Interconnect Traces 56 connects to Well B Bi-color Indicator 60. Flexible Printed Circuit Board Electrical Interconnect Traces 56 connects to Well C Bi-color Indicator 58. Flexible Printed Circuit Board Electrical Interconnect Traces 56 connects Momentary Switch 64. Flexible Printed Circuit Board Electrical Interconnect Traces 56 is integrated with Flexible Printed Circuit Board Interconnect Ribbon Cable 44. Flexible Printed Circuit Board Interconnect Ribbon Cable 44 connects with Flexible Printed Circuit Board Interconnect Ribbon Cable Connector Plug 42. Flexible Printed Circuit Board Interconnect Ribbon Cable Connector Plug 42 connects to Main Electronics Printed Circuit Board Input-Output Connector Jack 40.

Micro-controller 54 is preferably model PIC16F684 from Microchip Technology Inc., Chandler, Ariz., and the like. The application of this micro-controller is adapted for general controller usage and is well know to those familiar with micro-controller technology. Micro-controller 54 includes within its structure random access memory, read only memory for program storage, electrically erase-able programmable memory, internal oscillator, two voltage comparators, analog-to-digital converter and input-output control circuitry of which portions of these circuitries are use to control the operation of the invention.

Micro-controller 54 connects to Main Electronics Printed Circuit Board Electrical Interconnect Traces 52 that are used to provide electrical circuit paths of control signals and electrical power. Main Electronics Printed Circuit Board Electrical Interconnect Traces 52 connects to Sound Emitter 24. Main Electronics Printed Circuit Board Electrical Interconnect Traces 52 connects to Reference Temperature Sensor 26. Main Electronics Printed Circuit Board Electrical Interconnect Traces 52 connects to Well A Material Sensor 28. Main Electronics Printed Circuit Board Electrical Interconnect Traces 52 connects to Well B Material Sensor 32. Main Electronics Printed Circuit Board Electrical Interconnect Traces 52 connects to Well C Material Sensor 36. Main Electronics Printed Circuit Board Electrical Interconnect Traces 52 connects to Well A Temperature sensor 30. Main Electronics Printed Circuit Board Electrical Interconnect Traces 52 connects to Well B Temperature sensor 34.

Main Electronics Printed Circuit Board Electrical Interconnect Traces 52 connects to Well C Temperature sensor 38. Main Electronics Printed Circuit Board Electrical Interconnect Traces 52 connects to Main Electronics Printed Circuit Board Input-Output Connector Jack 40. Main Electronics Printed Circuit Board Electrical Interconnect Traces 52 connects to Main Electronics Printed Circuit Board Input-Output Connector Power Jack 50.

Figure 2:
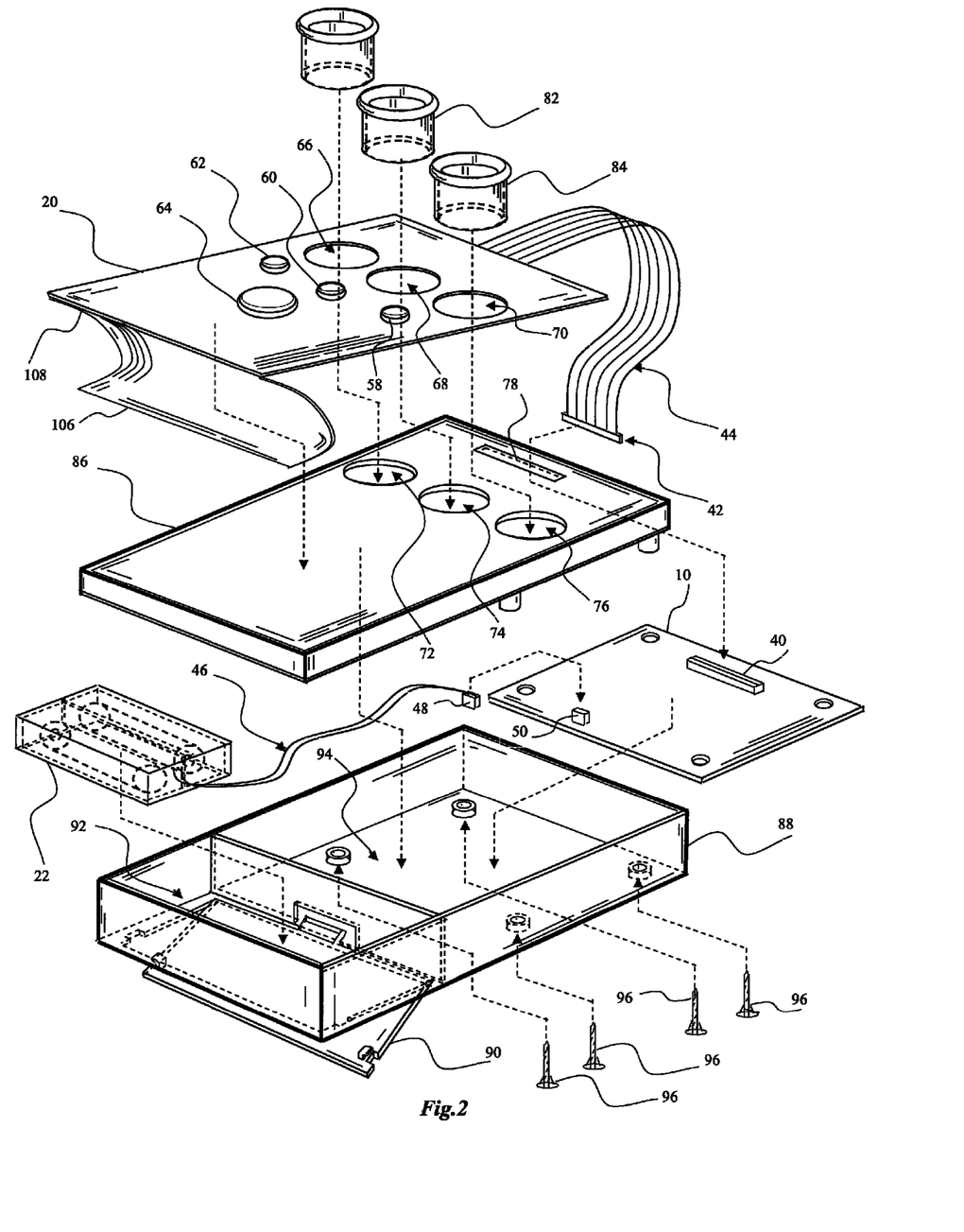
FIG. 2 is an elevated exploded view drawing of an embodiment of the invention.

FIG. 2 Illustrates an exploded view of a configuration of components that make up an embodiment embodiment of the invention. Flexible Printed Circuit Board Interconnect Ribbon Cable Connector Plug 42 and Flexible Printed Circuit Board Interconnect Ribbon Cable 44 are inserted respectively through Hole in Top Segment of Quality Control Material Monitor Enclosure for Ribbon Cable and Plug 78. Adhesive Film Material Protective Strip 106 is removed from bottom surface of Flexible Printed Circuit Board Including Related Components and Interconnect Ribbon Cable 20 to expose Adhesive Film Material 108 on bottom surface of Flexible Printed Circuit Board Including Related Components and Interconnect Ribbon Cable 20. Flexible Printed Circuit Board Including Related Components and Interconnect Ribbon Cable 20 is then affixed to Top Segment of Quality Control Material Monitor Enclosure 86 as Flexible Printed Circuit Board Interconnect Ribbon Cable Connector Plug 42 and Flexible Printed Circuit Board Interconnect Ribbon Cable 44 continue through Hole in Top Segment of Quality Control Material Monitor Enclosure for Ribbon Cable and Plug 78. Well A Bushing 80 is inserted through Hole in Flexible Printed Circuit Board For Well A Bushing Insertion 66 and continued through Hole in Top Segment of Quality Control Material Monitor Enclosure for Well A Bushing Insertion 72. Well B Bushing 82 is inserted through Hole in Flexible Printed Circuit Board For Well B Bushing Insertion 68 and continued through Hole in Top Segment of Quality Control Material Monitor Enclosure for Well B Bushing Insertion 74. Well C Bushing 84 is inserted through Hole in Flexible Printed Circuit Board For Well C Bushing Insertion 70 and continued through Hole in Top Segment of Quality Control Material Monitor Enclosure for Well C Bushing Insertion 76. Battery Compartment Access Panel of Quality Control Material Monitor Enclosure 90 is attached to Bottom Segment of Quality Control Material Monitor Enclosure 88. Battery Holder Including Batteries 22 is inserted into Battery Compartment of Quality Control Material Monitor Enclosure 92. Flexible Printed Circuit Board Interconnect Ribbon Cable Connector Plug 42 is connected to Main Electronics Printed Circuit Board Input-Output Connector Jack 40. Battery Holder Power Cable Connector Plug 48 is connected to Main Electronics Printed Circuit Board Connector Power Jack 50. Main Electronics Printed Circuit Board Including Related Components 10 is inserted into Electronics Component Compartment of Quality Control Material Monitor Enclosure 94.

Battery Holder Power Cable 46 is inserted into Electronics Component Compartment of Quality Control Material Monitor Enclosure 94. Top Segment of Quality Control Material Monitor Enclosure 86 is aligned with and placed on top of Bottom Segment of Quality Control Material Monitor Enclosure 88. Each Screw for Quality Control Material Monitor Enclosure 96 is inserted into Bottom Segment of Quality Control Material Monitor Enclosure 88 and secured through Main Electronics Printed Circuit Board Including Related Components 10 to Top Segment of Quality Control Material Monitor Enclosure 86.

Figure 3:
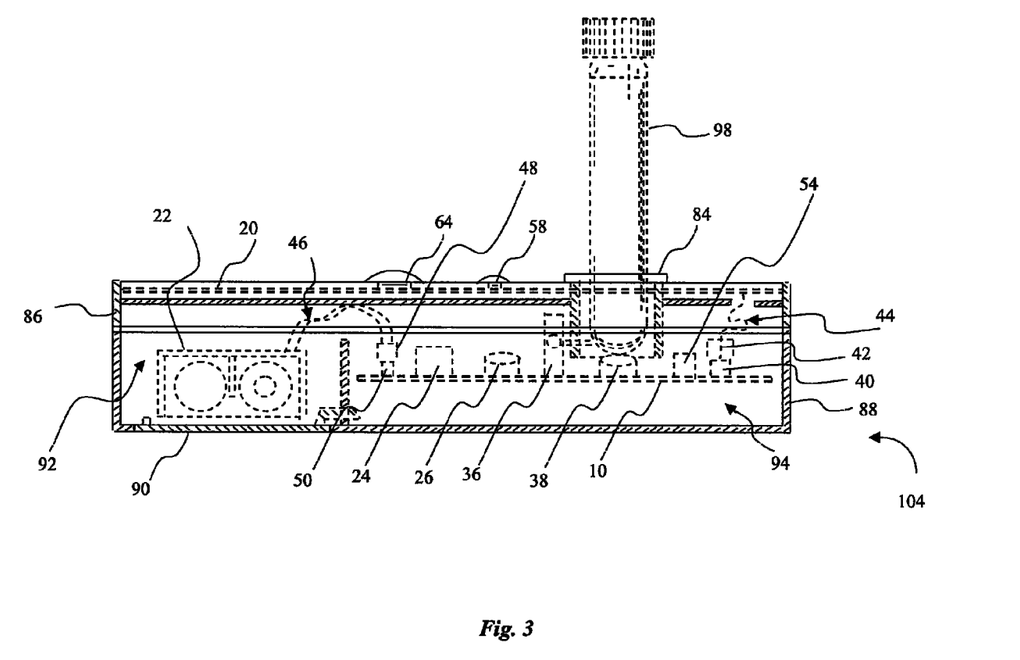
FIG. 3 is a right-side sectional view of an embodiment of the invention with an inserted vial.

FIG. 3 is an illustration of a side view of one design of the Assembled Quality Control Material Monitor 104 showing one internal configuration of a preferred construction and placement of internal components and that shows a Quality Control Material Vial Inserted into Well A of Quality Control Material Monitor Enclosure 98. The numbered elements pertain to those referred to in FIGS. 1 and 2.

Figure 4:
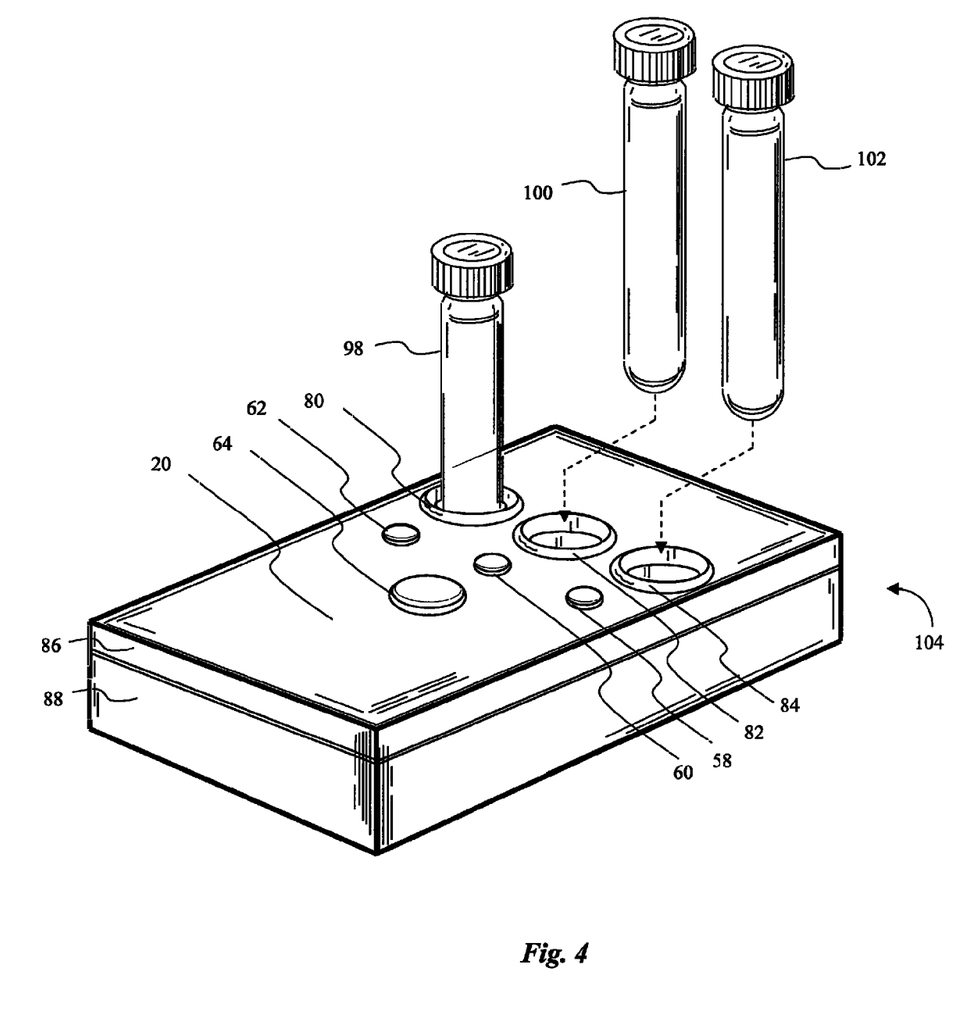
FIG. 4 is an elevated view of an embodiment of the invention showing one inserted vial and two non-inserted vials.
Figure 5A:
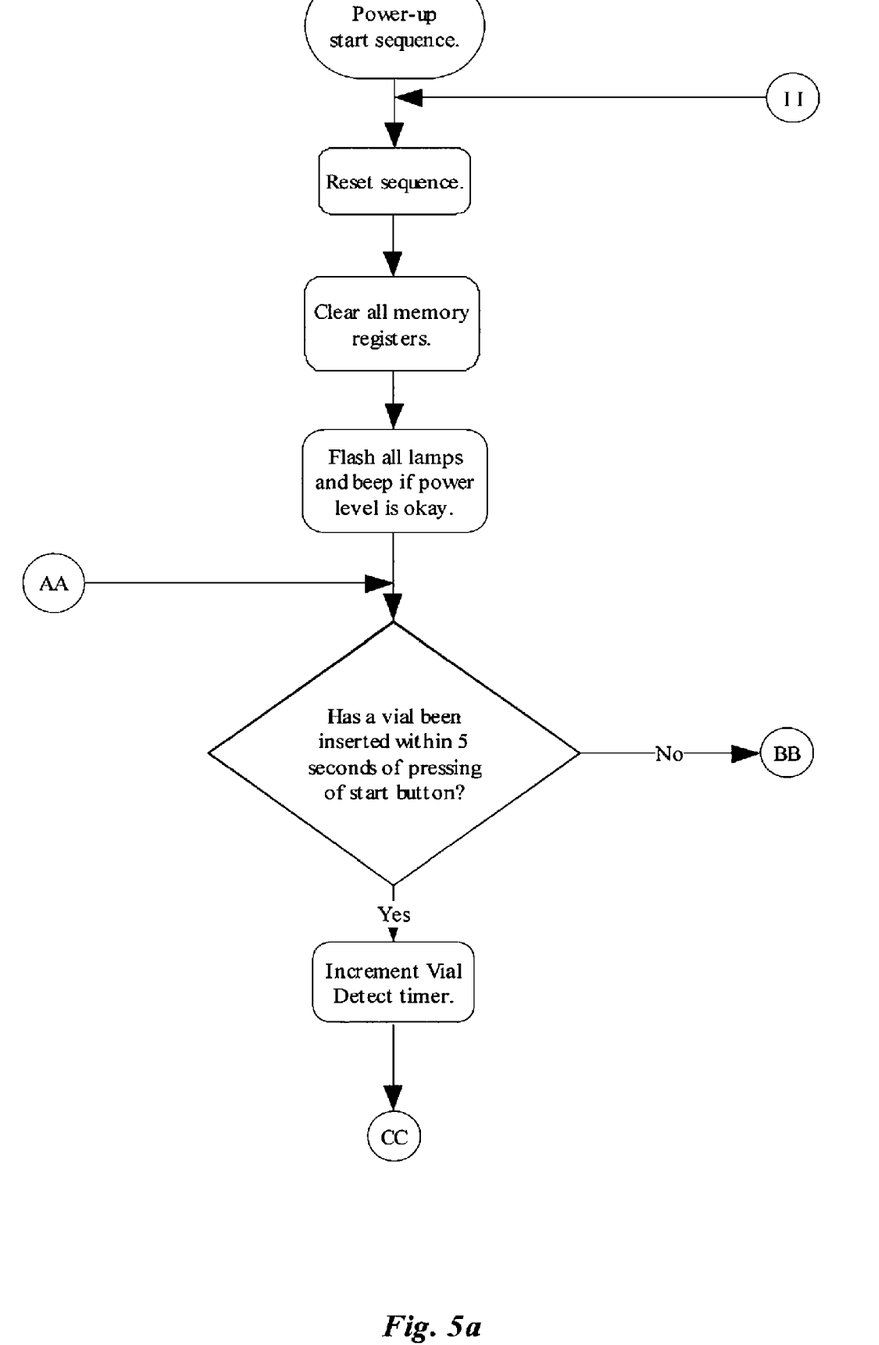
Figure 5B:
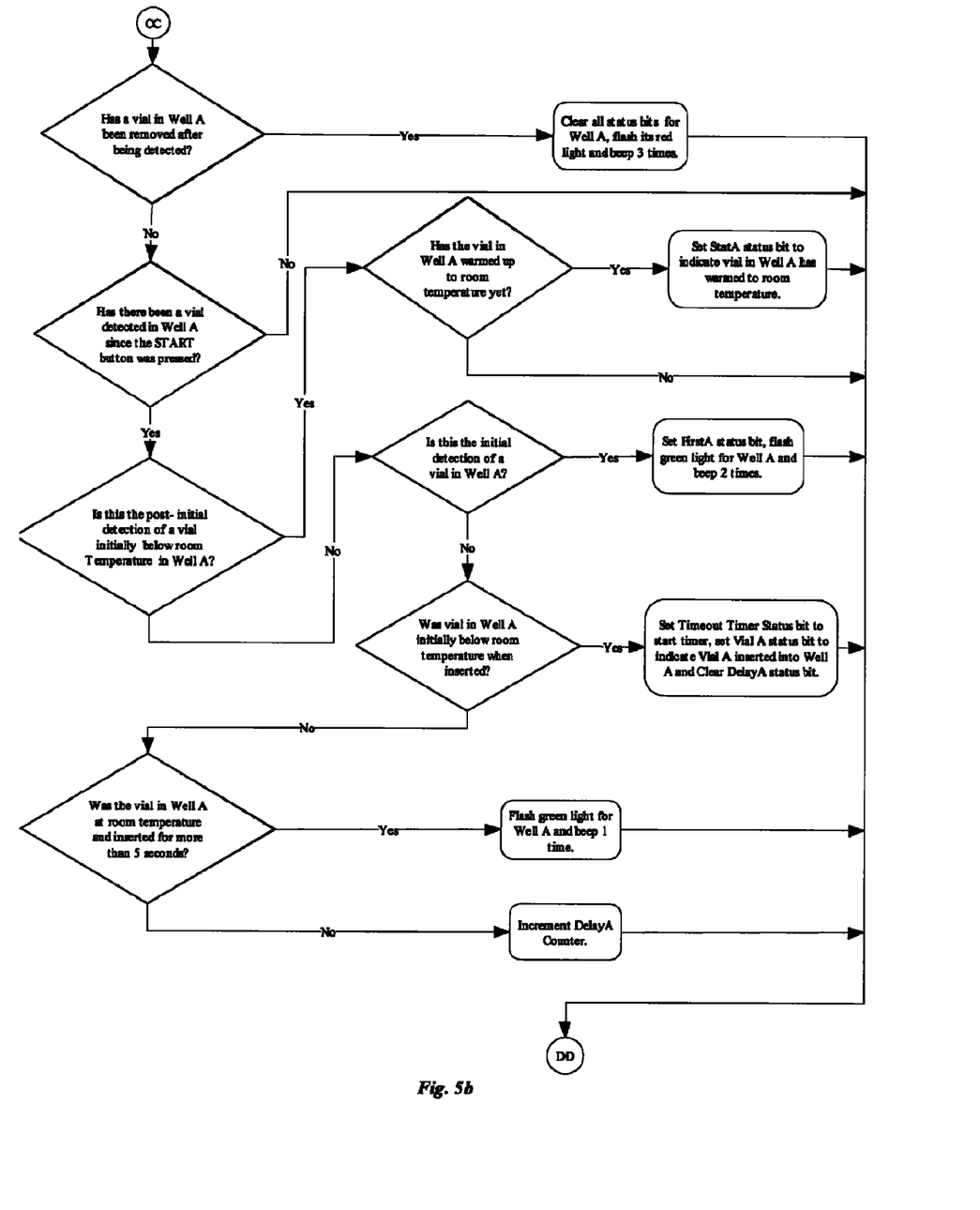
Figure 5C:
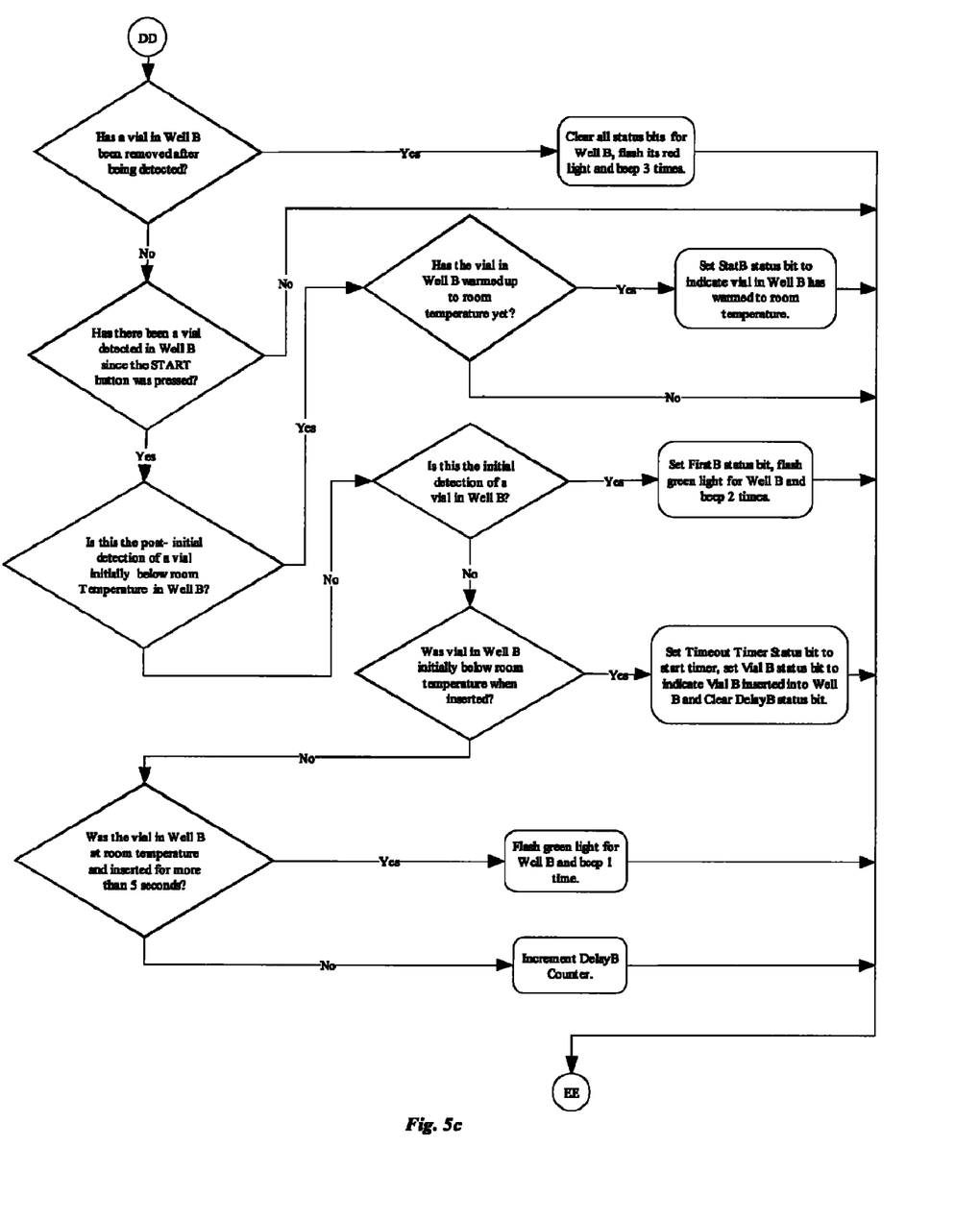
Figure 5D:
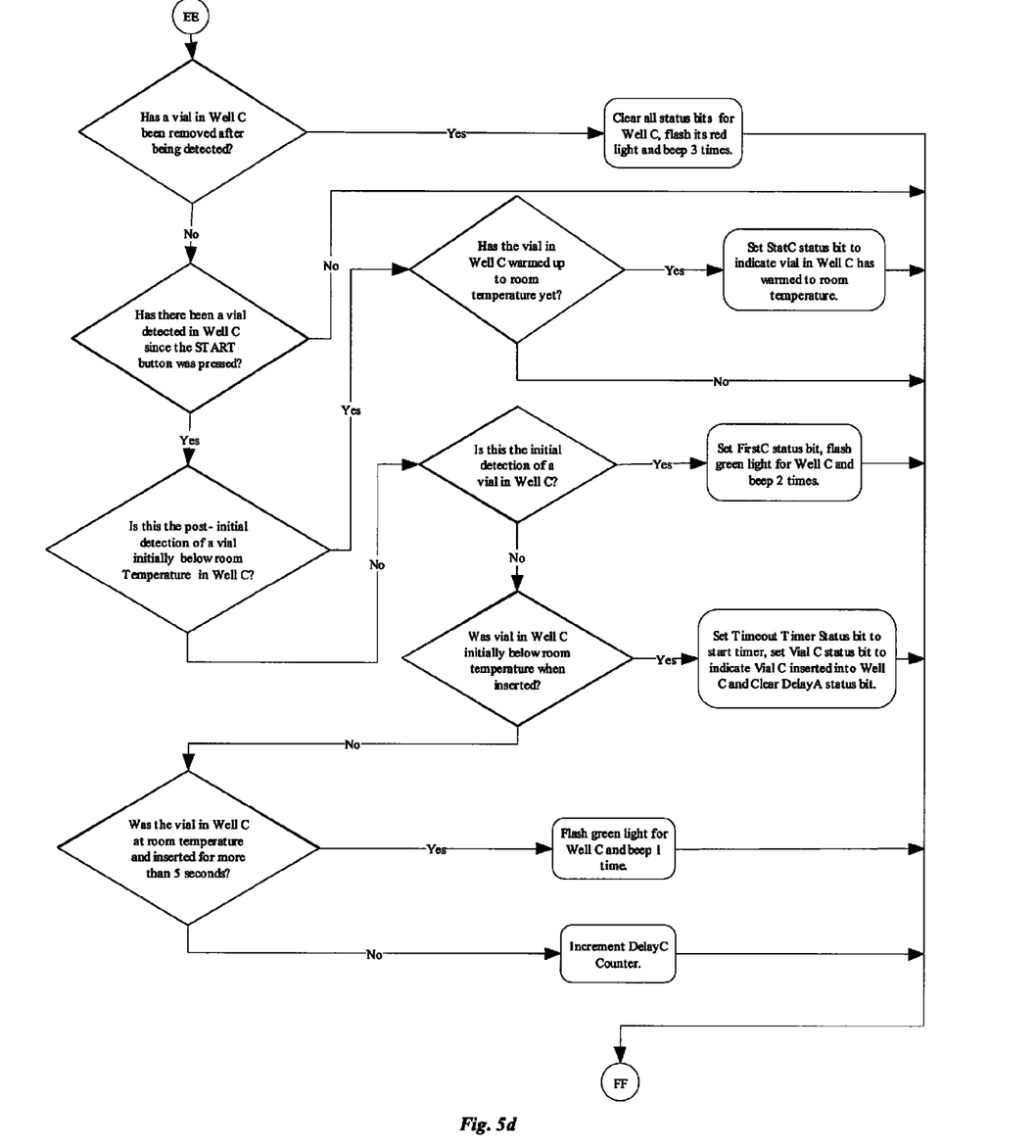
Figure 5E:
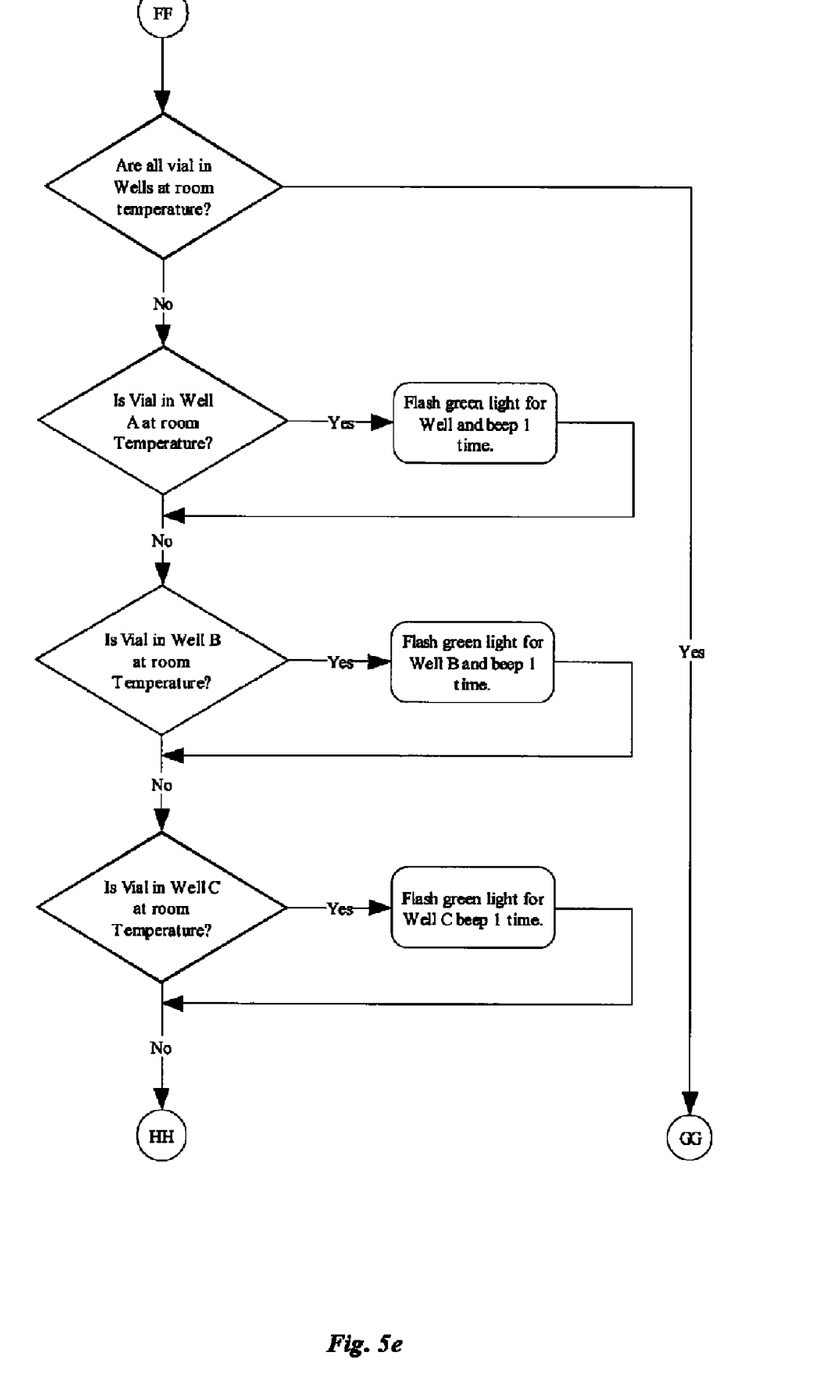
Figure 5F:
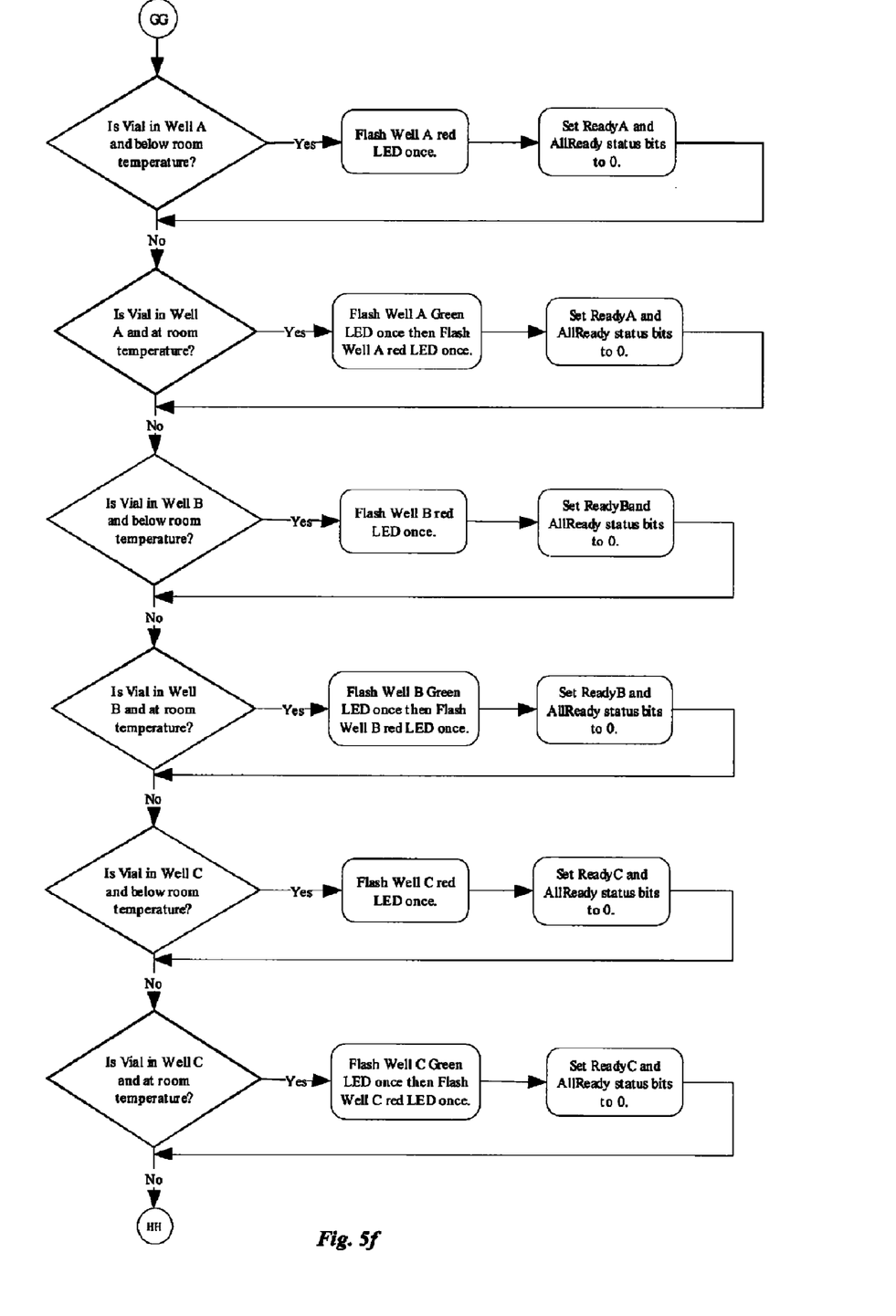
Figure 5G:
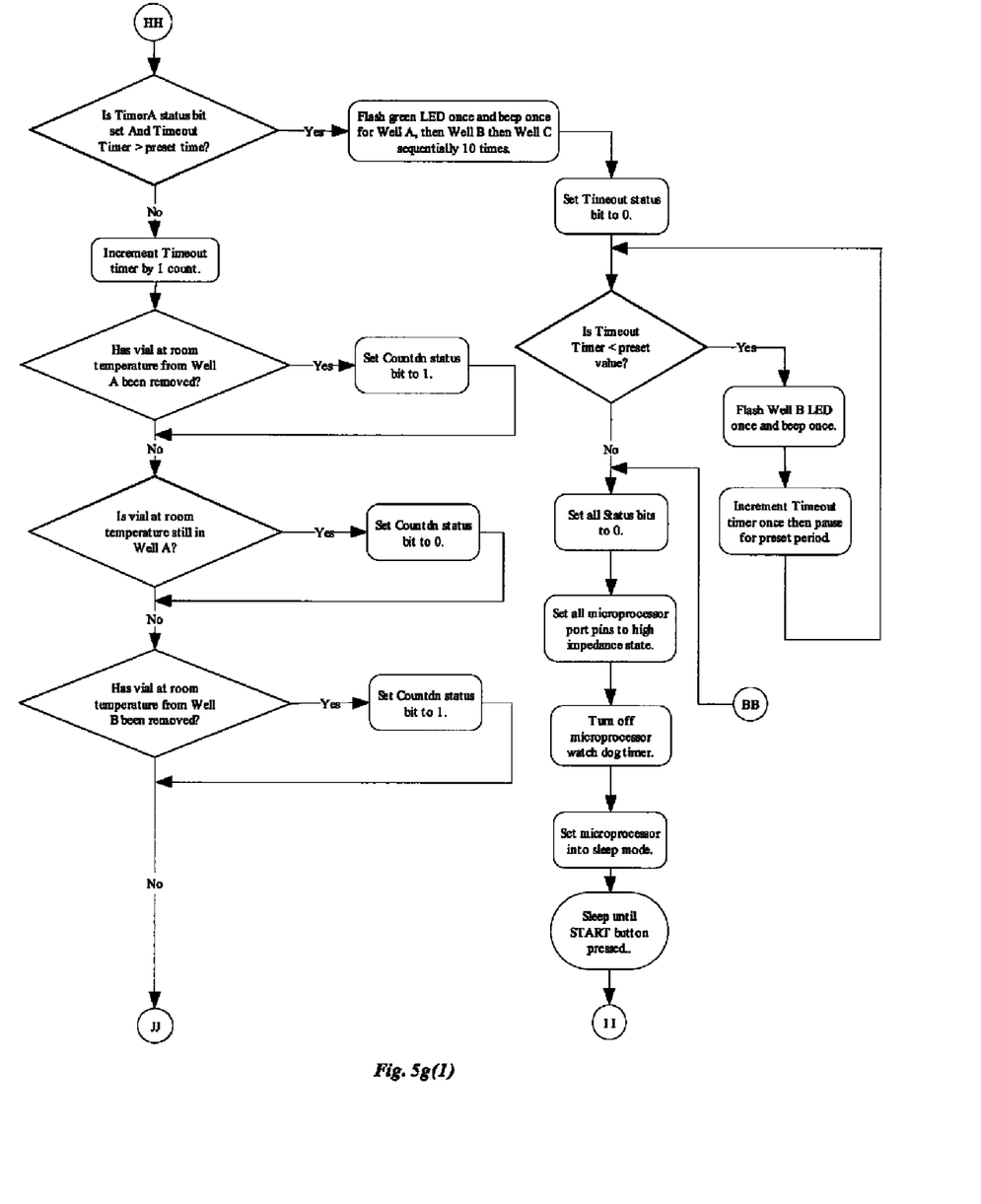

FIG. 4 is an illustration of an elevated view of an embodiment of the Assembled Quality Control Material Monitor 104 showing a Quality Control Material Vial Inserted into Well A of Quality Control Material Monitor Enclosure 98 and the Illustration of Second Quality Control Material Vial Ready for Insertion into Well B 100 and the Illustration of Third Quality Control Material Vial Ready for Insertion into Well C 102. The other numbered elements pertain to those referred to in FIGS. 1 and 2.

FIG. 5 is a program flowchart of a preferred operation of the invention and illustrates per sequence steps show how the invention performs its preferred function.

The disclosures of all cited patent documents, publications and references are incorporated herein in their entirety to the extent not inconsistent with the teachings herein. It should be understood that the examples and embodiments described herein are for illustrative purposes only and that various modifications or changes in light thereof will be suggested to persons skilled in the art and are to be included within the spirit and purview of this application and the scope of the appended claims

What is claimed is:
1. An apparatus to determine the thermal status of a material sample, the apparatus comprising;
   a) at least one receptacle for receiving said material sample defined in said apparatus,
   b) at least one sample temperature sensor in communication with said receptacle so as to be sufficient to detect material sample temperature,
   c) at least one indicator,
   d) at least one reference temperature sensor to detect ambient temperature,
   e) a power supply to provide electrical power to operate said apparatus, and
   f) at least one micro controller comprising a first program code module for causing said microcontroller to obtain a sample temperature signal from said at least one temperature sensor and to compare said temperature signal only with an ambient temperature signal from said at least one reference temperature sensor; and a second program code module for causing said at least one indicator to actuate upon said sample temperature signal equating, within a range of five percent, to said ambient temperature signal.

2. The apparatus in claim 1 further comprising an actuator and at least one material sensor in communication with said at least one receptacle so as to be sufficient to detect a presence of said material sample, and wherein said microcontroller comprises a third program code module for causing said microcontroller to obtain a signal from said at least one material sensor upon actuating said actuator, whereby a presence of a material sample in said at least one receptacle is determined.

3. The apparatus in claim 1 further comprising of a means to monitor the temperature said material sample.

4. The apparatus of claim 1, further comprising an LCD or LED display screen, or analog display device.

5. The apparatus in claim 1, wherein said indicator comprises a sound-producing device.

6. The apparatus in claim 1, wherein said power supply provides electricity comprising at least one of a battery and AC power.

7. The apparatus in claim 1, wherein said apparatus comprises a plurality of receptacles and a plurality of sample temperature sensors and said micro-controller comprises a program code module for causing said microcontroller to detect signals from said plurality of sample temperature sensors whereby a temperature of more than one material sample can be monitored and compared to ambient temperature.

8. The apparatus in claim 1, wherein said apparatus comprises a keypad to enter programmable data about said material sample.

9. The apparatus in claim 1, wherein said indicator is a meter.

10. The apparatus in claim 1, wherein said indicator comprises an illuminating device.

11. The apparatus of claim 10, wherein said illuminating device is an LED light or incandescent light.

* * * * *